United States Patent
Somin et al.

(10) Patent No.: US 7,941,244 B2
(45) Date of Patent: May 10, 2011

(54) STOW AND SORTATION SYSTEM

(75) Inventors: Irina M. Somin, Bellevue, WA (US);
Eric Young, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 760 days.

(21) Appl. No.: 11/860,943

(22) Filed: Sep. 25, 2007

(65) Prior Publication Data

US 2009/0081008 A1    Mar. 26, 2009

(51) Int. Cl.
    *G06F 7/00*          (2006.01)
    *G06F 19/00*        (2011.01)

(52) U.S. Cl. ........ 700/216; 700/214; 700/215; 700/218; 705/3; 235/385

(58) Field of Classification Search ........................ None
See application file for complete search history.

(56) References Cited

U.S. PATENT DOCUMENTS

| | | | |
|---|---|---|---|
| 5,385,243 | A | 1/1995 | Jackson et al. |
| 5,977,501 | A | 11/1999 | Werkheiser et al. |
| 7,055,741 | B2 | 6/2006 | Bong et al. |
| 7,084,365 | B2 | 8/2006 | Whitnable |
| 2005/0067318 | A1* | 3/2005 | Cesario .................. 206/524.6 |
| 2005/0149226 | A1* | 7/2005 | Stevens et al. ........... 700/214 |

* cited by examiner

*Primary Examiner* — Gene Crawford
*Assistant Examiner* — Yolanda Cumbess
(74) *Attorney, Agent, or Firm* — Robert C. Kowert; Meyertons, Hood, Kivlin, Kowert & Goetzel, P.C.

(57) ABSTRACT

System and method for sortation of picked inventory into individual orders in an order fulfillment process, for example order fulfillment processes in materials handling facilities. Collections of items picked from inventory for multiple orders are stowed to locations at a stow and sortation station. The items for a particular order may be stowed to two or more different locations, and items for two or more orders may be stowed to one location; no particular location is assigned to or reserved for each order. Thus, no space is allocated or reserved for incomplete orders at the station. When all items for a particular order are stowed to locations at the station, the order may be picked from the various locations at the station and placed into order receptacles. The order receptacles may be shipping containers.

19 Claims, 7 Drawing Sheets

STOW AND SORTATION SYSTEM

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as materials handling facilities). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

The order fulfillment process may include a sortation process, in which mixed batches of units picked for orders are sorted into their respective orders. For example, requests (e.g., orders) for items from requestors may be divided among multiple pickers, who then pick mixed batches of items. The orders may be subdivided among the pickers; therefore, two or more of the pickers may pick items for one order. Consequently, a sort operation to select the proper units of items for given orders from the aggregations of units items returned by each respective picker is required. Conventionally, sorting may be performed using automated sorting mechanisms or manual sorting systems. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

In typical automated sorting mechanisms, individual units of items are inducted from picked batches of mixed items directly onto the sortation mechanism into carriers (e.g., tilt trays) that are fixed to the sortation mechanism. Thus, typical automated sorting mechanisms that are used in materials handling facilities tend to be linear sorting systems. Linear sorting inducts or places individual units of items from picked batches of items (referred to as singulation) onto an individual tray or transport mechanism that is a fixed component of a linear piece of automated equipment. All of the trays or transport mechanisms are connected in a linear sequence (typically in a circle or oval continuously-running loop). An item is placed directly onto a carrier of the automated sorting mechanism. The linear sequence of carriers moves past chutes, slots or receptacles adjacent to or integrated with the sortation mechanism. Each chute is assigned to a particular order in the order processing stream. When a carrier comes into alignment with a chute assigned to an order that requires a unit of the item contained in the carrier, the unit in the carrier is automatically moved from the carrier into the chute. This may be done by "tilting" the carrier or by some other mechanism.

The number of chutes of an automated sortation mechanism may determine the number of orders in the order processing stream. For example, if there are 2000 chutes, then 2000 orders may be processed at one time. When an order in a chute is complete, a new order may be inducted into the order processing stream.

Automated sorting systems tend to be limited in velocity, total capacity, and the size and types of items that can be sorted. Automated sorting mechanisms are typically expensive in both cost and floor area. Automated sorting mechanisms tend to not be flexible, and typically do not scale well as inventory throughput demands change, since implementing a fractional solution is often impractical if not impossible. For example, to address a 30-40% increase in order throughput requirement may require purchasing an entire new sorting mechanism, effectively doubling throughput capacity despite leaving 60-70% of the new capacity unutilized, while also taking up at least twice as much floor space.

Figure 1:
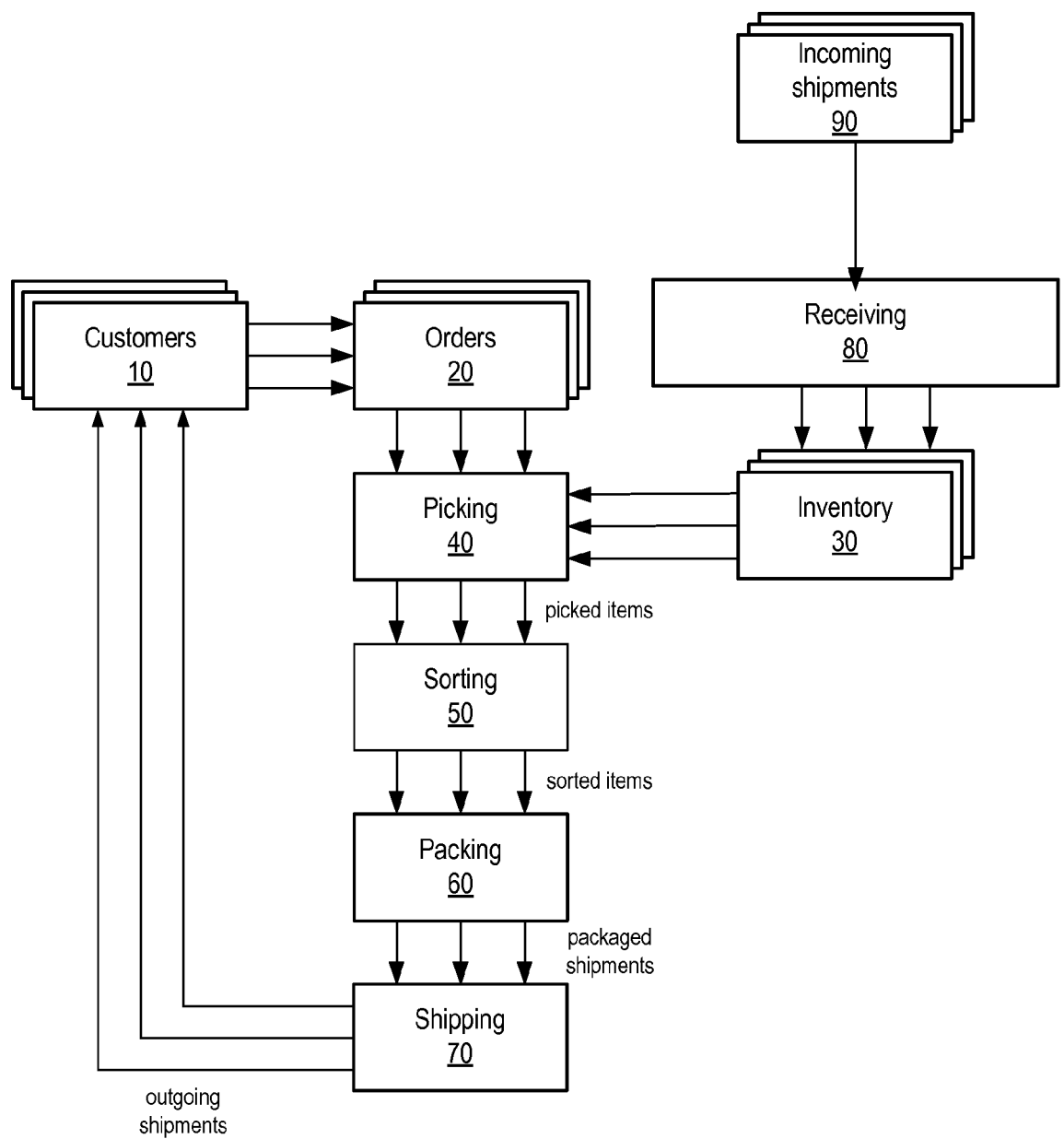
FIG. 1 illustrates a logical representation or view of the operation of a materials handling facility in which embodiments of the stow and sortation system may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a stow and sortation system and method for sortation of picked inventory into individual orders in an order fulfillment process, for example order fulfillment processes in materials handling facilities, are described. Embodiments of a stow and sortation system are described for performing order-level sortation of collections of picked units of items for a plurality of orders. In conventional manual and automated sortation systems, typically units of items picked for orders are accumulated into slots, chutes, or other types of receptacles, with one order assigned to each receptacle. For example, in an automated sortation system that employs Crisplant sorters, one chute (receptacle) is assigned to each order. Similarly, in conventional manual sortation systems, one slot, shelf, or other receptacle in a bin or other sorting unit is typically assigned to each order. Thus, in conventional sortation systems, stowage space may not be efficiently used. For example, some orders may include only one or two units, and thus may not come close to filling a slot in the sortation system. Furthermore, dwell time in the slots or receptacles may not be efficiently used, as an order "occupies" a slot from the time the order is assigned to the slot or until all items in the order have been picked and stowed to the slot.

In embodiments of a stow and sortation system, instead of assigning one location, or slot, to each order, collections of units of items picked from inventory for multiple orders are conveyed to the stow and sortation station and stowed to locations, or slots, at the stow and sortation station. Pick lists of items may be assigned to different agents (pickers) for picking the listed items from inventory into collections (e.g., into pick receptacles). The pick lists may not be associated with any particular order, and thus a pick list may include items for two or more different orders. Picking instructions for an order may be divided among two or more pickers; thus, different pickers may be assigned to pick items for the same order. For example, items may be assigned to pickers according to location in the inventory storage area to minimize the distance the picker has to travel to pick one or more collections of items indicated by a pick list on a pick run. Since different pickers may be picking items for a particular order and may be picking the items at different times, portions of particular orders may be stowed to different locations or slots at the stow and sortation station, and portions of particular orders may be stowed to locations or slots at different times.

The units of items for a particular order may be stowed to two or more different slots at the stow and sortation station, and units of items for two or more orders may be stowed to one slot; no particular slot is assigned to each order. Thus, in one embodiment, an agent may randomly select a slot to which a particular collection of items is to be stowed. The slots may be shelves, subdivisions of shelves, totes, subdivided floor space, or some other receptacle or location. In one embodiment, the stow and sortation station may include one or more shelving units or bins, with each bin subdivided into two or more slots. When all units of items for a particular order are stowed to slots at the stow and sortation station, the order is then picked from the various slots in the stow and sortation station (sortation). Thus, in embodiments, there are two "pick" stages. In the first (stow) stage, collections of orders are picked from locations in inventory and stowed to the slots of the stow and sortation station. In the second pick (sortation) stage, units of items are picked from the slots in the stow and sortation station and sorted into individual orders.

In the first picking stage, agents (pickers) pick units of items from inventory for multiple orders and place the items into pick receptacles under the direction of a materials handling facility control system. When the picker picks an item for placement into a pick receptacle, the picker may scan or otherwise enter the identifier of the picked unit and the identifier of the pick receptacle into which the unit is to be placed to inform the control system of the placement of the unit. Once a picker has completed an assigned pick run, the picker conveys the pick receptacle(s) to the stow and sortation station. Each pick receptacle may, but does not necessarily include units picked for multiple orders. At the stow and sortation station, the unit(s) of items in each pick receptacle are stowed to a slot of the stow and sortation station. Alternatively, the entire pick receptacle may be stowed to a slot. The slot may be, but is not necessarily, empty when the picker stows the units or the pick receptacle into the slot. An agent (who may be, but is not necessarily, the picker) may scan or otherwise enter an identifier on the pick receptacle into the control system, and may also scan or otherwise enter an identifier of the particular slot into the control system, to inform the control system of the stowage and location (slot) of the pick receptacle or the units from the pick receptacle.

In one embodiment, for at least some pick receptacles, units from the receptacle may be stowed to two or more slots of the stow and sortation station. In this embodiment, rather than entering the identifier of the pick receptacle, the agent may individually enter each unit from the pick receptacle and the slot to which the unit is stowed.

The second picking stage is the sortation stage. When the control system detects that an order has been completed (i.e., that all units for the order have been picked from inventory and stowed to slots in the stow and sortation station), the control system may initiate second-stage picking (sortation) for that order. In second-stage picking, agents working in the stow and sortation station pick individual units of items for orders that have been completely stowed to the slots and place the units into order receptacles associated with particular orders. Each order may be associated with one or more order receptacles, depending, for example, on the volume of the order. The order receptacles may be totes or other types of receptacles that may be conveyed to other stations of the materials handling facility for further processing (e.g., packing into shipping containers), or alternatively the order receptacles may be shipping containers.

In one embodiment, bulk quantities of fast-moving items (e.g., pallets or cases) may be stowed in a bulk stowage area at or near the stow and sortation station, or alternatively may be stowed to slots of the stow and sortation station, prior to binding the units of the items to orders. Rather than directing the picking of individual units of the item from inventory for particular orders and then stowing the units of the items into slots of the stow and sortation station, the control system may instead direct the picking of units of the item from the bulk stowage area, or from slots of the stow and sortation station in which quantities of the item are stowed, during the sortation process as described herein.

A materials handling facility may include one or more stow and sortation stations. In one embodiment, a stow and sortation station may be subdivided into two or more substations. Each substation may include one or more bins, with each bin subdivided into two or more slots. In one embodiment, particular agents may be assigned to work at particular substations. Alternatively, one or more of the agents may move between substations. Subdividing the stow and sortation station into substations and assigning particular agents to particular substations may, for example, help to reduce the amount of walking that the agents have to do in the stow and sortation station.

In a stow and sortation station subdivided into substations, the units of items for a particular order may be stowed to two or more substations. Therefore, the order receptacles may be conveyed through the stow and sortation station from substation to substation using a manual or automated conveyance system or mechanism so that individual orders may be picked from the stowage slots in the various substations and sorted into the order receptacles. Thus, in one embodiment, the substations in a stow and sortation station may be arranged sequentially from a first substation to a last substation.

In one embodiment of a stow and sortation station subdivided into substations, at least one substation may be assigned to receive pick receptacles that include units of items for particular types or categories of orders. For example, the distributor may offer express shipping to customers whereby a customer may elect to have an order expressly delivered, for example, overnight. Rather than stowing picked units for these orders generally across the substations of the stow and sortation station, any pick receptacle that includes at least one item for such an order may be delivered and stowed to a particular substation under direction of the control system. This substation may, for example, be sufficiently staffed with agents to insure that orders are picked from the substation in a timely manner.

In one embodiment, as noted above, the order receptacles into which orders are sorted at the stow and sortation station may be shipping containers associated with or assigned to the order by the control system. In one embodiment, sorting directly into shipping containers assigned to the order by the control system may enable the distributor to more easily use special packaging for particular orders than conventional sortation systems. For example, embodiments of the stow and sortation system may enable a distributor to "brand" or label the shipping containers for particular entities. A materials handling facility may process orders for two or more entities to be delivered to customers that ordered items via the entities. The materials handling facility may provide shipping containers that are or that may be customized for the particular entities, e.g. by attaching a label indicating the entity onto the shipping containers. The control system is aware of which orders are associated with particular entities. Thus, the control system may associate "branded" shipping containers with particular orders, direct the induction of the "branded" shipping containers into the stow and sortation station, and direct the picking of units of items into the "branded" shipping containers in the stow and sortation station.

Embodiments of the stow and sortation system may enable the late binding of units of items to orders, and thus may enable the control system to switch units between orders. The control system knows which items are needed to fulfill all active orders in the control system, knows the relevant urgency of the orders, knows how long an order has been active in the process, and is also aware of where in the order fulfillment process the items for each order are currently located. Thus, the control system may determine that a unit of an item needed to fulfill a first order has been picked and stowed to the stow and sortation station for a second order. The control system may switch the picked and stowed unit to the first order and direct the agents at the stow and sortation station to pick the unit to fulfill the first order. The control system may then generate another pick instruction to pick another unit of the item from inventory for the second order, if necessary, or alternatively may modify a pick instruction generated for the first order to indicate that the item to be picked (or possibly already picked) is to be associated with the second order.

Embodiments of the stow and sortation system as described herein may be implemented as the sortation mechanism for a materials handling facility, or alternatively may be used in conjunction with one or more other sortation mechanisms in a materials handling facility. For example, a stow and sortation station as described herein may be used to supplement another manual or automated sortation system in a materials handling facility during peak periods.

Embodiments of the stow and sortation system are flexible and scalable to adapt to changes in inventory throughput. Expanding capacity is relatively easy and inexpensive when compared to conventional automated sortation mechanisms, as expansion simply requires the addition of additional slots and/or bins at a stow and sortation station. A shelf including one or more slots may be added to a bin at the stow and sortation station to provide a minimum expansion. A bin may be added to provide another level of expansion. One or more additional substations may be added to a stow and sortation station to provide additional expansion. Additional agents may be assigned to work at the stow and sortation station to handle increases in throughput. Thus, embodiments of the stow and sortation system tend to be scalable at a more granular level than automated sortation systems such as Cristplant sorters. Furthermore, slots at a stow and sortation station may be increased or decreased in size, enabling adjustments for changes in average inventory size and/or order size. Furthermore, a stow and sortation station may include slots of varying sizes so that small batches of picked units or batches of picked smaller items do not necessarily occupy an entire larger slot, but instead may be stowed to a smaller slot. These aspects, along with the fact that each order does not occupy an entire slot for the duration of the processing of the order as in conventional sortation systems, may help a materials handling facility to efficiently use stowage space in the sortation area.

FIG. 1 illustrates a logical representation or view of the operation of a materials handling facility in which embodiments of the stow and sortation system may be implemented. For example, this Figure may illustrate an order fulfillment center of a product distributor. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Collections of picked items may be delivered or conveyed, if necessary, to one or more stow and sortation stations in the materials handling facility for sorting 50 into their respective orders. Sorted orders may be delivered to packing 60 or to some other station for further processing, if necessary and, finally to shipping 70 for delivery to the customers 10. In embodiments of the stow and sortation system, picked items may be delivered to a stow and sortation station, where collections of units of items may be stowed to slots under control of a control system. No sorting into orders is done during the initial picking from inventory and stowage into the slots of the stow and sortation station; thus, a slot may include picked units for two or more orders. Units of items to fulfill particular orders may then be picked from the slots and sorted into order receptacles associated with particular orders under direction of the control system. An exemplary stow and sortation station is described below. A picked, packed and shipped order does not necessarily include all of the items ordered by the customer; an outgoing shipment to a customer may include only a subset of the ordered items available to ship at one time from one inventory-storing location.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2A:
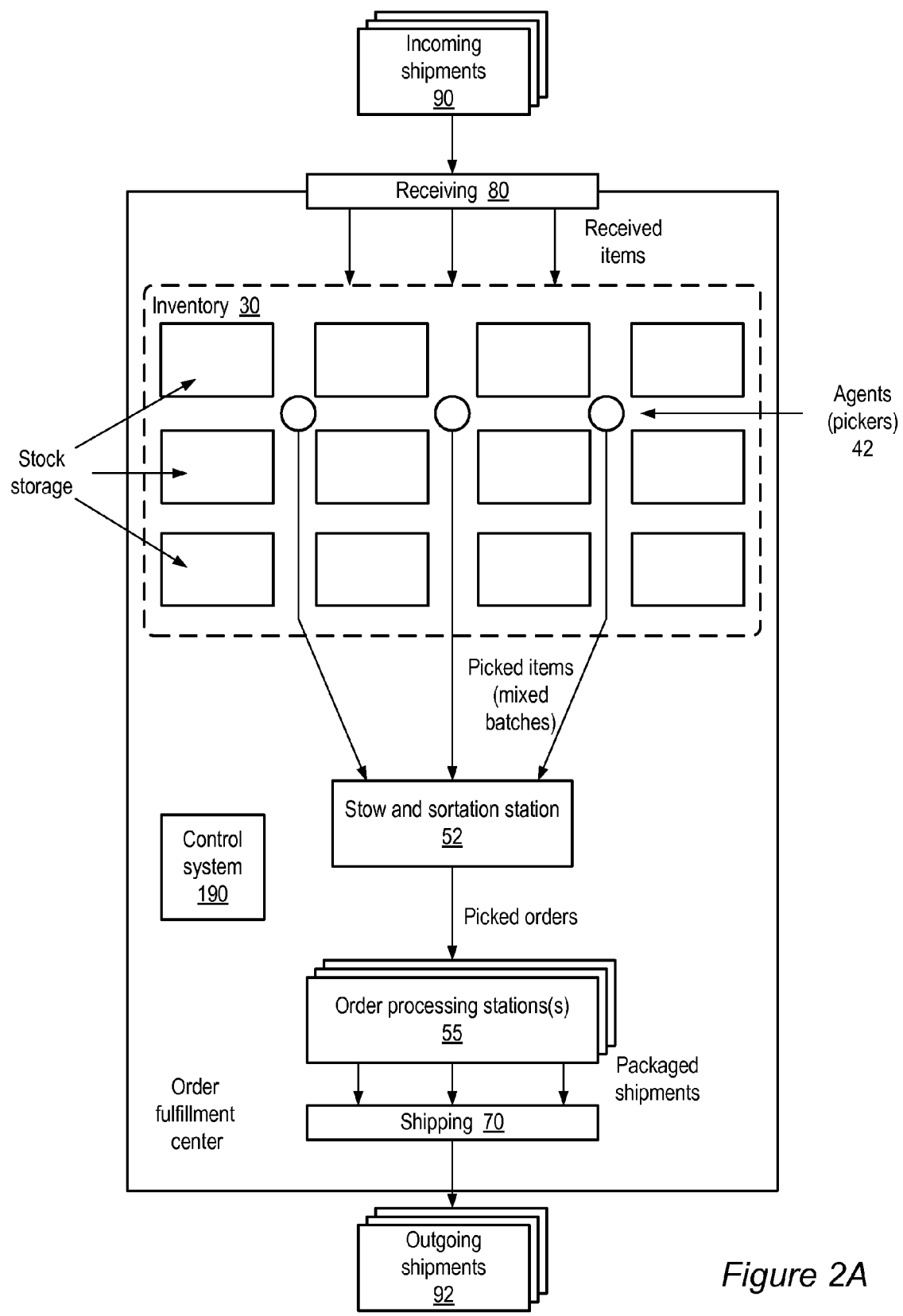
FIGS. 2A and 2B illustrates exemplary physical layouts of a materials handling facility, such as an order fulfillment facility or center, in which embodiments of the stow and sortation system may be implemented.
Figure 2B:
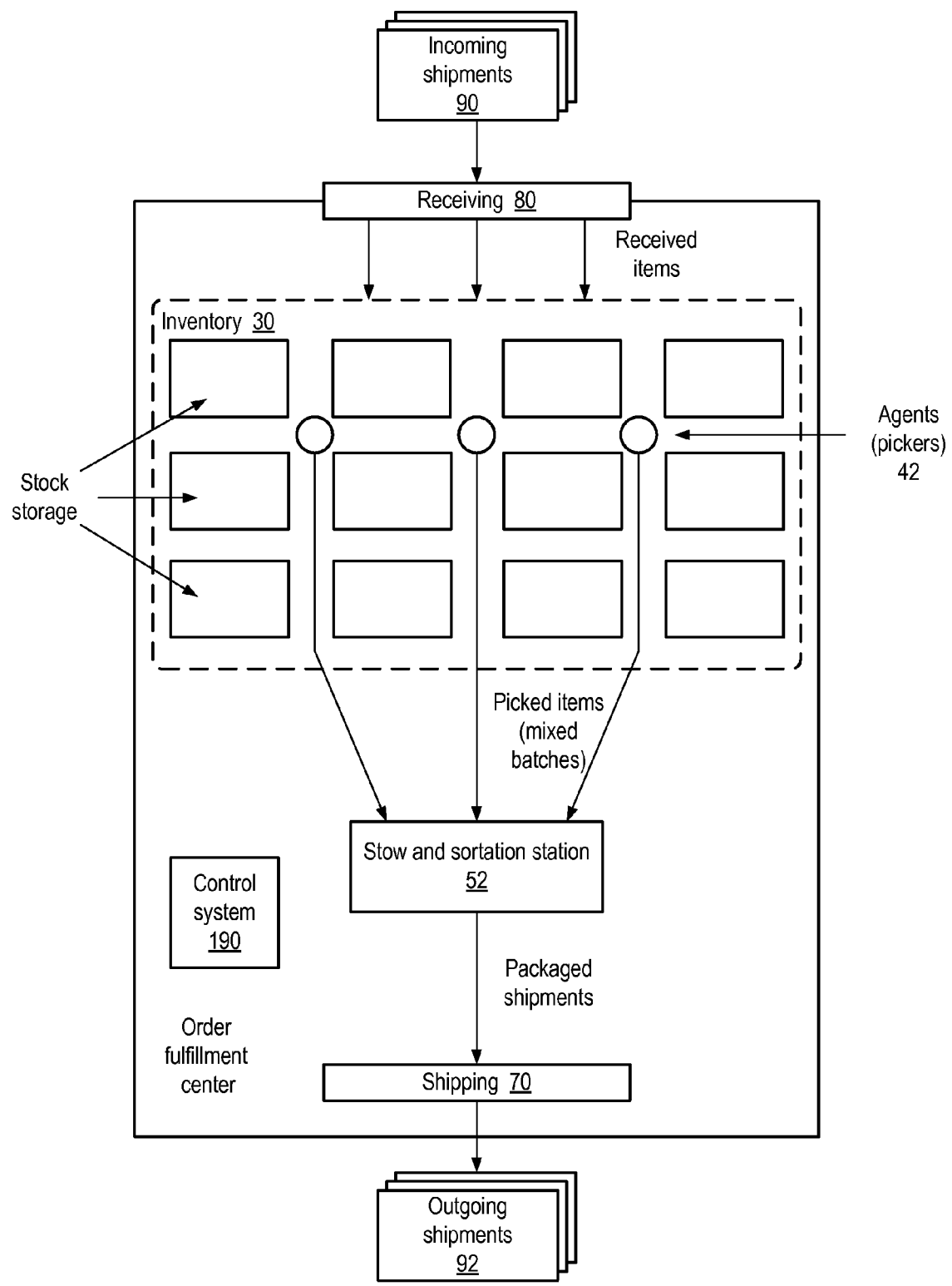

FIGS. 2A and 2B illustrates exemplary physical layouts of a materials handling facility, such as an order fulfillment facility or center, in which embodiments of the stow and sortation system may be implemented. At any one time, one or more agents 42 of the distributor may each be picking items from inventory 30 to fulfill portions or all of one or more requests or orders. This may result in a stream and/or batches of picked items for multiple incomplete or complete orders, which may then be delivered to stow and sortation station 52.

At the stow and sortation station 52, collections (e.g., totes or pick receptacles each including one or more units of items for one or more orders) may be stowed to slots. The units may be removed from a pick receptacle and stowed to a slot, or alternatively the entire pick receptacle may be stowed to a slot. A slot may be, but is not necessarily, empty when the units in a pick receptacle, or the receptacle itself, is stowed to the slot. An identifier on the pick receptacle and an identifier of the slot into which the pick receptacle is stowed, or alternatively into which the contents of the pick receptacle are stowed, may be scanned or otherwise entered into the control system. When the control system detects that an order has been completed (e.g., that all units of items for that order have been picked from inventory and stowed to the slots of the stow and sortation station 52), the control system may initiate a pick for that order to direct agent(s) at the stow and sortation station 52 to pick the order from the slots of the stow and sortation station 52 into one or more order receptacles assigned to the order by the control system. Once all units of items for a particular order are picked from the slots of the stow and sortation station 52 and placed into the order receptacles assigned to the order, the order receptacles may be, but are not necessarily, conveyed to one or more of various order processing stations 55 for additional processing prior to shipping 70, for example to a packing station for packing into shipping containers, as is illustrated in FIG. 2A. In one embodiment, the order receptacles may be shipping containers (e.g., boxes, envelopes, etc.), and thus in one embodiment at least a portion of packing may be performed at the stow and sortation station 52 as part of the sortation process, and the order receptacles may be delivered directly to shipping 70 from the stow and sortation station 52, as is illustrated in FIG. 2B.

An order fulfillment center may also include one or more receiving 80 operations for receiving shipments 90 of stock from various vendors. The received stock may then be placed into stock storage. The receiving 80 operation may also receive and process returned, purchased, or rented items from customers. The various operations and stations of an order fulfillment center may be located in one building or facility, or alternatively may be spread or subdivided across two or more buildings or facilities.

Figure 3:
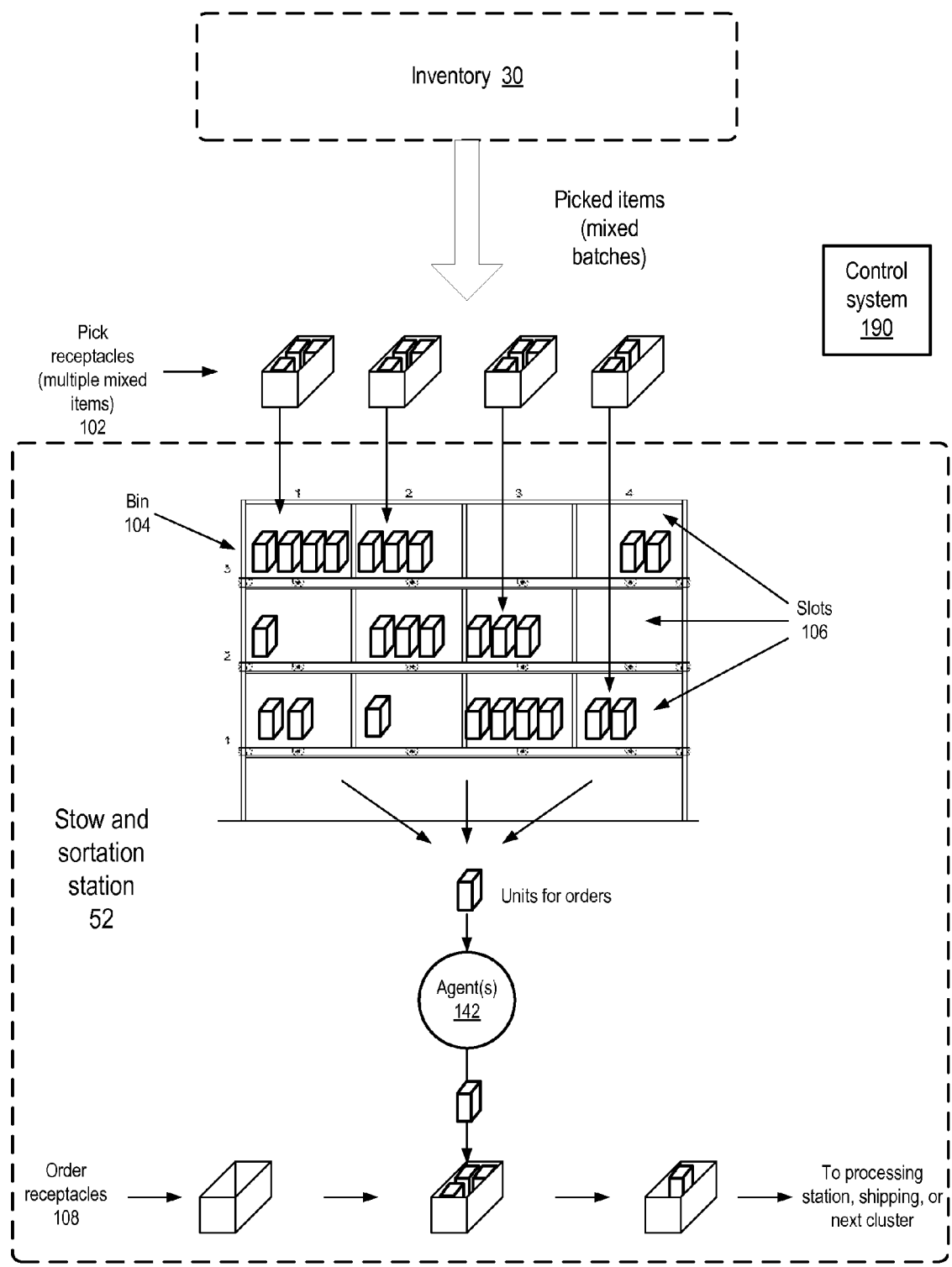
FIG. 3 illustrates a stow and sortation station in a materials handling facility, according to one embodiment.

FIG. 3 illustrates a stow and sortation station in a materials handling facility, according to one embodiment. In embodiments of a stow and sortation system, instead of assigning one slot to each order as in conventional sortation systems, collections (pick receptacles 102) of units of items picked from inventory 30 for multiple orders are stowed to slots 106 in a stow and sortation station 52. In one embodiment, as illustrated in FIG. 3, the stow and sortation station may include one or more bins 104, with each bin 104 subdivided into two or more slots 106. When all units of items for a particular order are stowed to slots 106 at the stow and sortation station 52, the order may then be picked from the various slots 106 of the stow and sortation station (sortation) under direction of control system 190. The units of items for a particular order may be stowed to two or more different slots 106, and units of items for two or more orders may be stowed to one slot 106; no particular slot 106 is assigned to each order. Thus, in embodiments, there are two "pick" stages. In the first (stow) stage, collections of orders are picked from locations in inventory 30 and stowed to the slots 106 of the stow and sortation station 52. In the second pick (sortation) stage, units of items are picked from the slots 106 in the stow and sortation station 52 and sorted into order receptacles 108.

In the first picking stage, agents (pickers) pick units of items from inventory 30 for multiple orders and place the items into pick receptacles 102 under the direction of a materials handling facility control system 190. When the picker picks an item for placement into a pick receptacle 102, the picker may scan or otherwise enter the identifier of the picked unit and the identifier of the pick receptacle 102 into which the unit is to be placed to inform the control system 190 of the placement of the unit.

Each picked unit of an item may be associated with the particular pick receptacle 102 that the unit is picked into. In one embodiment, the association of a unit of an item with a particular pick receptacle 102 may be performed by reading, scanning or otherwise entering an item identifier associated with the item and a receptacle identifier associated with the particular pick receptacle 102 into which the unit is picked. The item identifier and receptacle identifier may be communicated to a control system 190 of the materials handling facility via wired and/or wireless communications. Each pick receptacle 102 may include a unique receptacle identifier that uniquely identifies the particular pick receptacle in the materials handling facility. The receptacle identifier may, for example, be indicated by a bar code, Radio Frequency Identifier (RFID) device, or some other scannable or readable mechanism, mark, or tag attached to or integrated with the pick receptacle.

Each unit of each item carried in inventory 30 may include an item identifier. A type of item held in inventory 30 may be referred to herein as simply an item. The term item identifier refers to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item.

Cases, boxes, bundles, or other collections of units of items may similarly be marked or tagged with item identifiers. The units of items in a collection may all be of the same type of item, for example a case of 12 units of a particular item, or may be a collection of one or more units of each of two or more heterogeneous items. A collection of units of item(s) (e.g., a case containing 12 units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, embodiments of the stow and sortation system, in addition to sorting individual units of items, may also sort collections of units of item(s) designated as units. Therefore, the pick receptacles, slots 106 of stow and sortation stations 52, and order receptacles 108 described herein may receive collections of units of item(s) that are designated as units as well as individual units of items.

Figure 6:
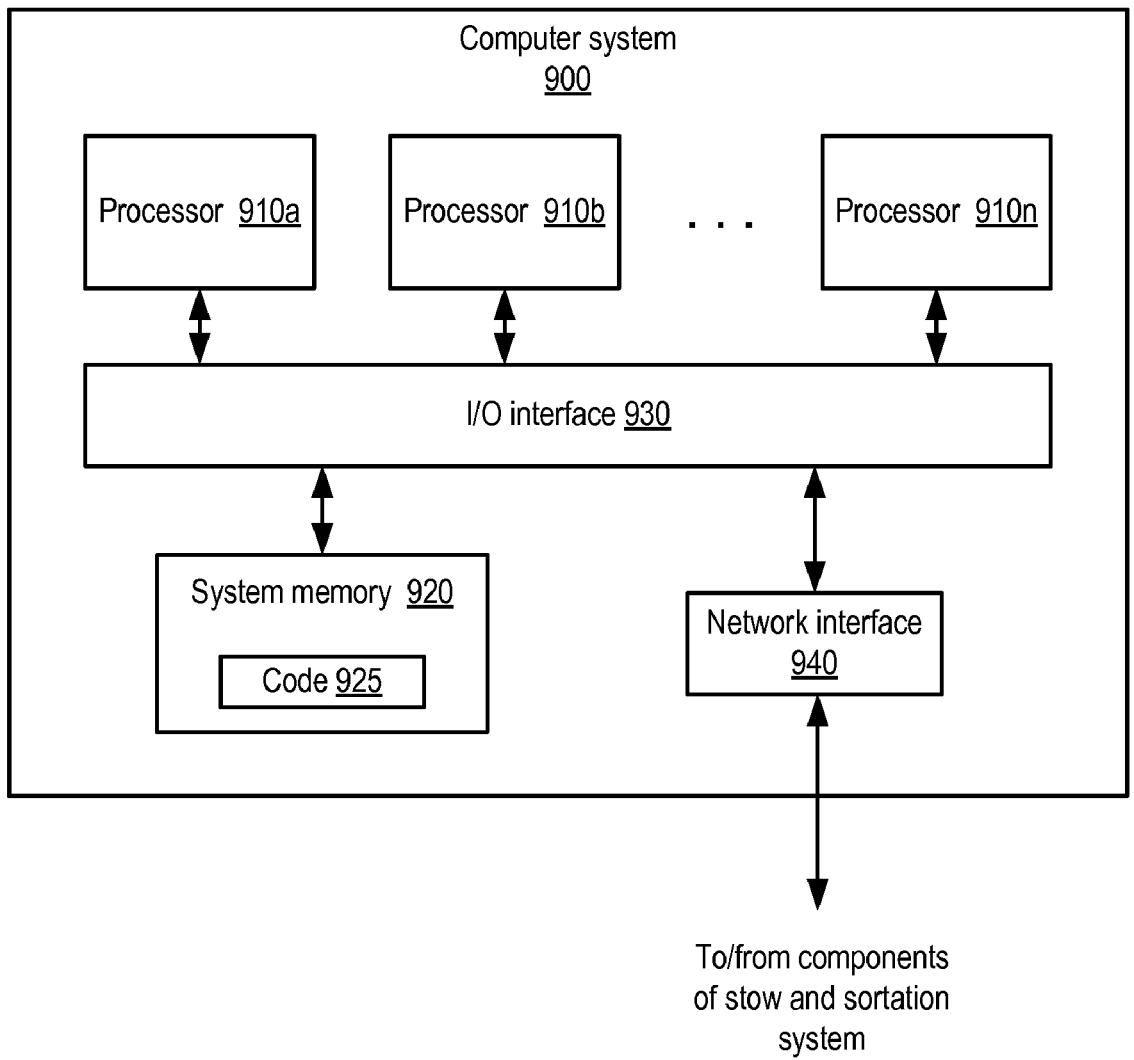
FIG. 6 is a block diagram illustrating an exemplary embodiment of a computer system.

A materials handling facility may include a control system 190 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 190 is illustrated in FIG. 6.

Once a picker has completed an assigned pick run, the picker conveys the one or more pick receptacle(s) 102 to the stow and sortation station 52. Conveyance of the pick receptacles 102 to the stow and sortation station 52 may be performed by any of a variety of means; manually carrying the receptacles, manual push carts, motorized carts, induction onto automated conveyance mechanisms, etc. Each pick receptacle 102 may, but does not necessarily, include units picked for multiple orders. At the stow and sortation station 52, the unit(s) of items in each pick receptacle 102 are stowed to a slot 106 of the stow and sortation station 52. Alternatively, the entire pick receptacle 102 may be stowed to a slot 106. The slot 106 may be, but is not necessarily, empty when the units or the pick receptacle 102 is stowed to the slot 106. In one embodiment, an agent (who may be, but is not necessarily, the picker) may randomly select a slot 106 into which a particular pick receptacle 102 (or the contents of the receptacle 102) is to be stowed. The agent may scan or otherwise enter an identifier on the pick receptacle 102 into the control system 190, and may also scan or otherwise enter an identifier of the particular slot 106 into the control system 190, to inform the control system 190 of the stowage and location (slot) of the pick receptacle 102 or the units from the pick receptacle 102. In another embodiment, the control system 190 may indicate to the agent a particular slot 106 into which a particular pick receptacle 102 (or the contents of the receptacle 102) is to be placed.

In one embodiment, the agent may select a particular slot 106 into which at least some items in a particular pick receptacle 102 are to be stowed in accordance with attributes of the items, for example the size and/or type of item. Allowing the agent to select particular slots 106 in which to stow particular items may facilitate better utilization of slot space and easier picking of items from the slots 106 in the second pick process (sortation). Thus, in this embodiment, for at least some pick receptacles 102, units from the receptacle 102 may be stowed to two or more slots 106 of the stow and sortation station 52. In this embodiment, rather than entering the identifier of the pick receptacle 102, the agent may individually enter an identifier of each unit from the pick receptacle and, for each unit, the identifier of the slot 106 into which the unit is stowed.

Each picked unit of the various items may be associated with the particular slot 106 of the stow and sortation station 52 into which the unit is stowed. In one embodiment, the association of the units of items in a pick receptacle 102 with a particular slot 106 may be performed by reading, scanning or otherwise entering an item identifier associated with the pick receptacle 102 and a slot identifier associated with the particular slot 106 into which the units from the pick receptacle 102 are stowed. As described above, in one embodiment, the units in each pick receptacle 102 were previously associated with the particular pick receptacle 102 during the first stage pick process from inventory 30, and thus it may not be necessary to re-scan each individual unit before stowing to slots 106. Note that, in one embodiment, the pick receptacle 102 containing the units may be stowed to a slot 106 without removing the units from the receptacle 102.

In one embodiment, units from a pick receptacle 102 may be stowed to two or more slots 106. In this embodiment, the association of a unit of an item with a particular slot 106 may be performed by reading, scanning or otherwise entering an item identifier associated with the item and a slot identifier associated with the particular slot 106 into which the unit is stowed. The item identifier and slot identifier may be communicated to a control system 190 of the materials handling facility via wired and/or wireless communications.

The second picking stage is the sortation stage. When the control system 190 detects that an order has been completed (i.e., that all units for the order have been picked from inventory 30 and stowed to slots 106 in the stow and sortation station 52), the control system 190 may initiate second-stage picking (sortation) for that order. In second-stage picking, agent(s) 142 working at the stow and sortation station 52 pick individual units of items for orders that have been completely stowed to the slots 106 and place the units into order receptacles 108 assigned to the particular orders under direction of the control system 190. In one embodiment, instead of human agents 142, an automated mechanism may be configured to pick individual units of items for orders from slots 106 and place the units into order receptacles 108 assigned to the particular orders under control of the control system 190. Each order may be assigned one or more order receptacles 108, depending, for example, on the volume of the order. Each order receptacle 108 is associated with one and only one order. The order receptacles 108 may be totes or other types of receptacles that, when completed (i.e., when all units of items for the associated order have been picked from slots 106 and placed into the order receptacle(s) 108 associated with the order), may be conveyed to other stations of the materials handling facility for further processing (e.g., packing), or alternatively the order receptacles 108 may be shipping containers (e.g., shipping boxes, envelopes, or other types of shipping packages).

In some embodiments, the control system may provide one or more mechanisms to assist the agents in picking units from slots 106 and placing the units into the proper order receptacles 108 at the stow and sortation station 52. For example, in one embodiment, each slot 106 may include a light or other indicator that the control system 190 activates for a particular slot 106 to indicate that a unit is to be picked from the slot 106 for placement into a current receptacle 108. As another example, in one embodiment, the agent may be equipped with a portable communications device, or alternatively a communications device may be located at or adjacent to a bin 104, on which the control system 190 may display textual and/or graphical instructions indicating which slot 106 to pick from and which item to pick from the slot. For example, an image of the item may be displayed on the communications device, and/or a textual description of the item may be displayed on the communications device. One of ordinary skill in the art will recognize that other methods for indicating which item to pick from which slot 106 may be implemented in a stow and sortation station 52 as described herein.

In one embodiment, each unit of an item may be associated with the particular order receptacle 108 that the unit is placed in at the stow and sortation station 52. In one embodiment, the association of a unit of an item with a particular order receptacle 108 may be performed by reading, scanning or otherwise entering an item identifier associated with the item and a receptacle identifier associated with the particular order receptacle 108 into which the unit is placed. The item identifier and receptacle identifier may be communicated to a control system 190 of the materials handling facility via wired and/or wireless communications. Each order receptacle 108 may include a unique receptacle identifier that uniquely identifies the particular order receptacle 108 in the materials handling facility. The receptacle identifier may, for example, be indicated by a bar code, Radio Frequency Identifier (RFID) device, or some other scannable or readable mechanism, mark, or tag attached to or integrated with the order receptacle 108.

In one embodiment, bulk quantities of fast-moving items (e.g., pallets or cases) may be stowed in a bulk stowage area at or near the stow and sortation station 52, or alternatively may be stowed to slots 106 of the stow and sortation station 52, prior to binding the units of the items to orders. Rather than directing the picking of individual units of the item from inventory 30 for particular orders and then stowing the units of the items into slots 106 of the stow and sortation station, the control system 190 may instead direct the picking of units of the item directly from the bulk stowage area, or from slots of the stow and sortation station 52, during the sortation process.

In one embodiment, as noted above, the order receptacles 108 into which orders are sorted at the stow and sortation station 52 may be shipping containers assigned to the order by the control system 190. In one embodiment, sorting directly into shipping containers assigned to the order by the control system 190 may enable the distributor to more easily use special packaging for particular orders than conventional sortation systems. For example, in one embodiment, the control system 190 may associate "branded" shipping containers with particular orders, direct the induction of the "branded" shipping containers into the stow and sortation station 190, and direct the picking of units of items from slots 106 into the "branded" shipping containers in the stow and sortation station 52.

Embodiments of the stow and sortation system may enable the late binding of units of items to orders, and thus may enable the control system 190 to switch units between orders. For example, the control system 190 may determine that a unit of an item needed to fulfill a first order has been picked and stowed to a slot 106 of the stow and sortation station 52 for a second order. The control system 190 may switch the picked unit to the first order and direct the agent(s) 142 at the stow and sortation station 52 to pick the unit to fulfill the first order. The control system 190 may then generate another pick instruction to pick another unit of the item from inventory 30 for the second order, if necessary, or may modify a pick instruction generated for the first order to indicate that the item to be picked (or possibly already picked) is to be associated with the second order.

In some materials handling facilities, items may be measured to determine the dimensions and weights of the items for use in item stowage, item handling, and shipping. These measurements may be entered into control system 190, which may use the information, for example, in assigning lists of items to be picked to receptacles and slots 106, in determining appropriate order receptacles 108, and so on. For example, a materials handling facility may have a limit on how much weight may be put into a pick receptacle 102 and/or order receptacle 108 for safe handling by agents or automated machinery of the materials handling facility. In one embodiment of the stow and sortation system as described herein, the measurement of items may be performed at the stow and sortation station 52 during processing. A unit of an item may be received in a pick receptacle 102 at the stow and sortation station 52. The control system 190 knows that the item has not been measured, and thus directs an agent, for example via a portable communications device carried by the agent, to measure the item. In one embodiment, an automated mechanism may be located at or near the stow and sortation station 52, and the agent may use the automated mechanism to weigh and measure the dimensions of the item and enter the measurements into the control system 190. After measuring the item, the agent may then stow the item into the appropriate slot 106 at the stow and sortation station 52. Since all of an order needs to accumulate at the stow and sortation station 52 before the order is picked into order receptacles 108, there is typically sufficient time to perform such measurements without impacting throughput.

Figure 4:
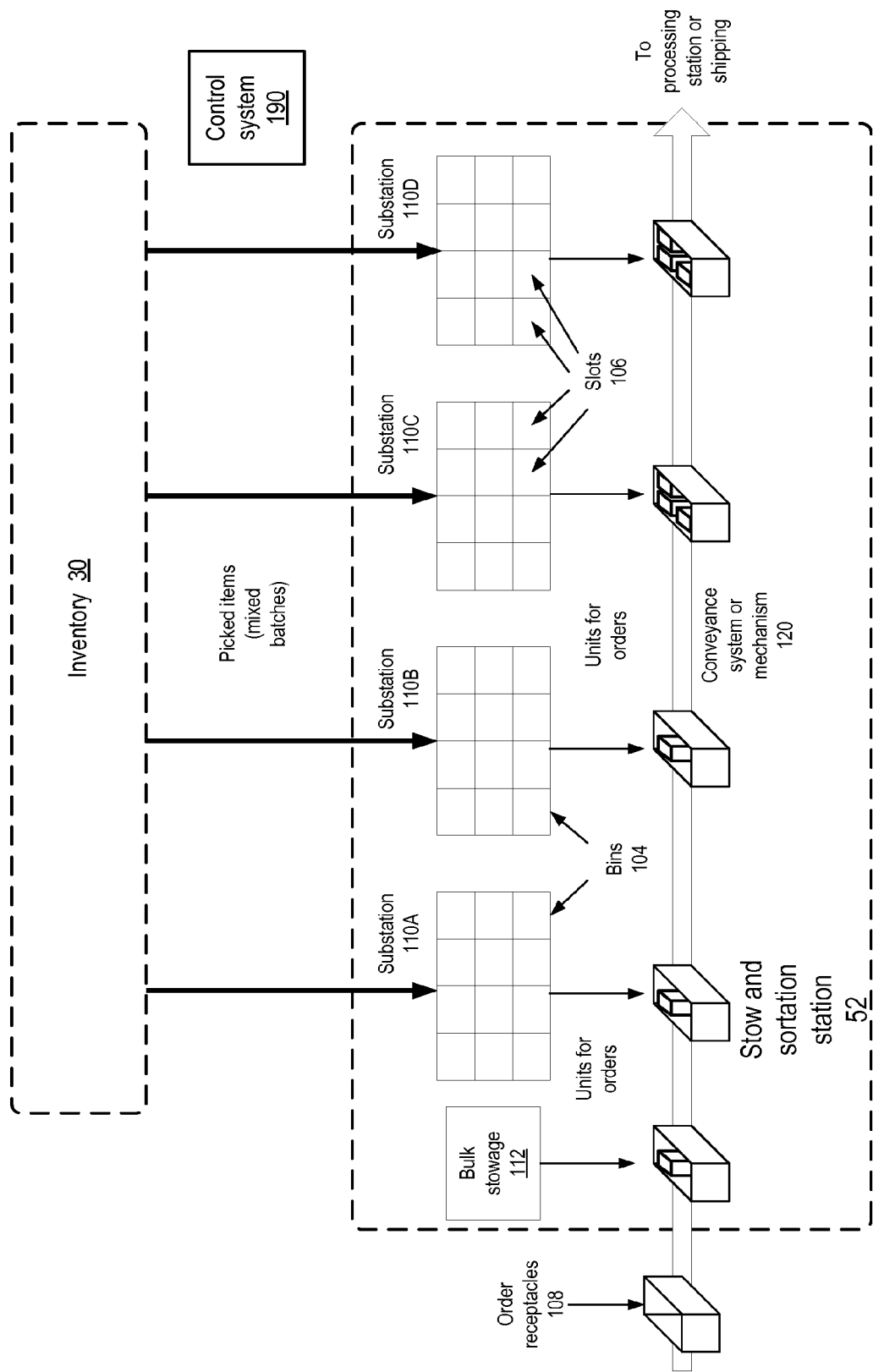
FIG. 4 illustrates a stow and sortation station that includes a plurality of substations, according to one embodiment.

FIG. 4 illustrates a stow and sortation station that includes a plurality of substations, according to one embodiment. In one embodiment, as illustrated in FIG. 4, the stow and sortation station may include or be subdivided into two or more substations 110. Each substation 110 may include one or more bins 104, with each bin 104 subdivided into two or more slots 106.

In a first picking stage, agents (pickers) pick units of items from inventory 30 for multiple orders and place the items into pick receptacles 102 under the direction of a materials handling facility control system 190. Once a picker has completed an assigned pick run, the picker conveys the one or more pick receptacle(s) 102 to a substation 110 of the stow and sortation station 52. In one embodiment, each picker may be directed to convey all pick receptacles 102 to a particular substation 110. In this embodiment, each picker may "pick to" a particular assigned substation 110. Alternatively, each picker may convey pick receptacles to randomly or otherwise selected substations 110. As yet another alternative, the control system 190 may direct the pickers to convey particular pick receptacles 102 to particular substations 110, for example to underutilized substations 110 or to substations 110 that are assigned to handle particular types of orders such as express or expedited orders.

Each pick receptacle 102 may, but does not necessarily, include units picked for multiple orders. At the substation 110, the unit(s) of items in each pick receptacle 102 are stowed to a slot 106 of the substation 110. Alternatively, the entire pick receptacle 102 may be stowed to a slot 106. The slot 106 may be, but is not necessarily, empty when the units are stowed or the pick receptacle 102 is stowed to the slot 106. An agent (who may be, but is not necessarily, the picker) may scan or otherwise enter an identifier on the pick receptacle 102 into the control system 190, and may also scan or otherwise enter an identifier of the particular slot 106 into the control system 190, to inform the control system 190 of the stowage and location (slot) of the pick receptacle 102 or the units from the pick receptacle 102. Thus, the control system knows which slot 106 and which substation 110 each pick receptacle 102 is stowed to.

In one embodiment, for at least some pick receptacles 102, units from the receptacle 102 may be stowed to two or more slots 106 of a substation 110, or even into two or more slots 106 in two or more substations 110. In this embodiment, rather than entering the identifier of the pick receptacle 102, the agent may individually enter an identifier of each unit from the pick receptacle 102 and, for each unit, the identifier of the slot 106 into which the unit is stowed.

The second picking stage is the sortation stage. When the control system 190 detects that an order has been completed (i.e., that all units for the order have been picked from inventory 30 and stowed to slots 106 in the substations 110 of the stow and sortation station 52), the control system 190 may initiate second-stage picking (sortation) for that order. In second-stage picking, agent(s) 142 working at the substations 110 in the stow and sortation station 52 pick individual units of items for orders that have been completely stowed to the slots 106 and place the units into order receptacles 108 assigned to the particular orders. In one embodiment, instead of human agents 142, an automated mechanism may be configured to pick individual units of items for orders from slots 106 and place the units into order receptacles 108 assigned to the particular orders. Each order may be assigned one or more order receptacles 108, depending, for example, on the volume of the order. Each order receptacle 108 is associated with one and only one order. The order receptacles 108 may be totes or other types of receptacles that, when completed, may be conveyed to other stations of the materials handling facility for further processing (e.g., packing), or alternatively the order receptacles 108 may be shipping containers (e.g., shipping boxes, envelopes, or other types of shipping packages).

In one embodiment, bulk quantities of fast-moving items (e.g., pallets or cases) may be stowed in a bulk stowage area 112 at or near the stow and sortation station 52, or alternatively may be stowed to slots 106 of one or more substations 110 in the stow and sortation station 52, prior to binding the units of the items to orders. Rather than directing the picking of individual units of the item from inventory 30 for particular orders and then stowing the units of the items into slots 106 in substations 110 of the stow and sortation station, the control system 190 may instead direct the picking of units of the item directly from the bulk stowage area, or from slots 106 in the one or more substations 110 of the stow and sortation station 52, during the sortation process.

In one embodiment, particular agents 142 may be assigned to work at particular substations 110. Subdividing the stow and sortation station 52 into substations 110 and assigning particular agents 142 to particular substations 110 may, for example, help to reduce the amount of walking that the agents have to do in the stow and sortation station 52. Alternatively, one or more of the agents 142 may move between substations 110.

In a stow and sortation station 52 subdivided into substations 110 as illustrated in FIG. 4, the units of items for a particular order may be stowed to two or more substations 110. In one embodiment, the order receptacles 108 may be conveyed through the stow and sortation station 52 from substation to substation using a manual or automated conveyance system or mechanism 120 so that individual orders may be picked from the stowage slots 106 in the various substations 110 and sorted into the order receptacles 108. In one embodiment, the substations 110 in a stow and sortation station 52 may be arranged sequentially from a first substation to a last substation. In FIG. 4, for example, substation 110A would be the first substation, and substation 110D would be the last substation. An order receptacle 108 arrives at a substation, for example at substation 110A. Units for the order associated with the order receptacle 108, if any are stowed at this substation 110A, are picked from the slots 106 at the substation 110A and placed into the order receptacle 108. When all units for the order receptacle 108 have been picked and placed into the receptacle, the order receptacle 108 is passed off to the next substation (substation 110B) for further sortation. At substation 110B, units for the order associated with the order receptacle 108, if any are stowed at this substation 110B, are picked from the slots 106 at the substation 110B and placed into the order receptacle 108. The order receptacle 108 is then passed on to the next substation 110C, and so on. When processing of the order receptacle 108 is completed at the last substation, substation 110D, the order receptacle is then conveyed to a downstream processing station for additional processing of the order, or alternatively is conveyed directly to shipping.

In one embodiment of a stow and sortation station 52 subdivided into substations 110, rather than processing order receptacles 108 sequentially through the two or more substations 110 as described above, order receptacles 108 may instead be delivered to one or more substations 110 for processing not according to any particular ordering of the substations 110. In contrast to the sequential processing as described above, this may be referred to as "random" or non-sequential processing of order receptacles 108 at substations 110 of a stow and sortation station 52. For example, in FIG. 4, one order receptacle 108 may be delivered directly to substation 110A for processing, and another order receptacle 108 may be delivered directly to substation 110D for processing. Once processing of an order receptacle 108 at a substation 110 is complete, the order receptacle 108 may, if necessary, be conveyed to another substation 110 for additional processing; otherwise, the order receptacle 108 may be conveyed to a downstream processing station or shipping. Thus, in this embodiment, an order receptacle 108 does not necessarily visit all substations 110 at a stow and sortation station 52. In one embodiment, a combination of sequential and random processing of order receptacles 108 at substations 110 of a stow and sortation station 52 may be implemented.

In one embodiment of a stow and sortation station 52 subdivided into substations 110, at least one substation 110, for example substation 110D of FIG. 4, may be assigned to receive pick receptacles 102 that include units of items for particular types or categories of orders under direction of the control system 190. For example, the distributor may offer express shipping to customers whereby a customer may select to have an order expedited or expressly delivered, for example, overnight. As another example, processing of an order may have been delayed for some reason, for example because a particular item was not available, and the order may thus require expedited processing to insure a promised shipping or delivery date is met. Rather than stowing picked units for these orders that need to be processed in a timely manner generally across the substations 110 of the stow and sortation station 52, each pick receptacle 102 that includes at least one item for such an order may be delivered and stowed to a particular substation, e.g. substation 110D, under direction of the control system 190. This substation 110D may, for example, be staffed with one or more additional agents to insure that orders are picked from the substation without delay.

Figure 5:
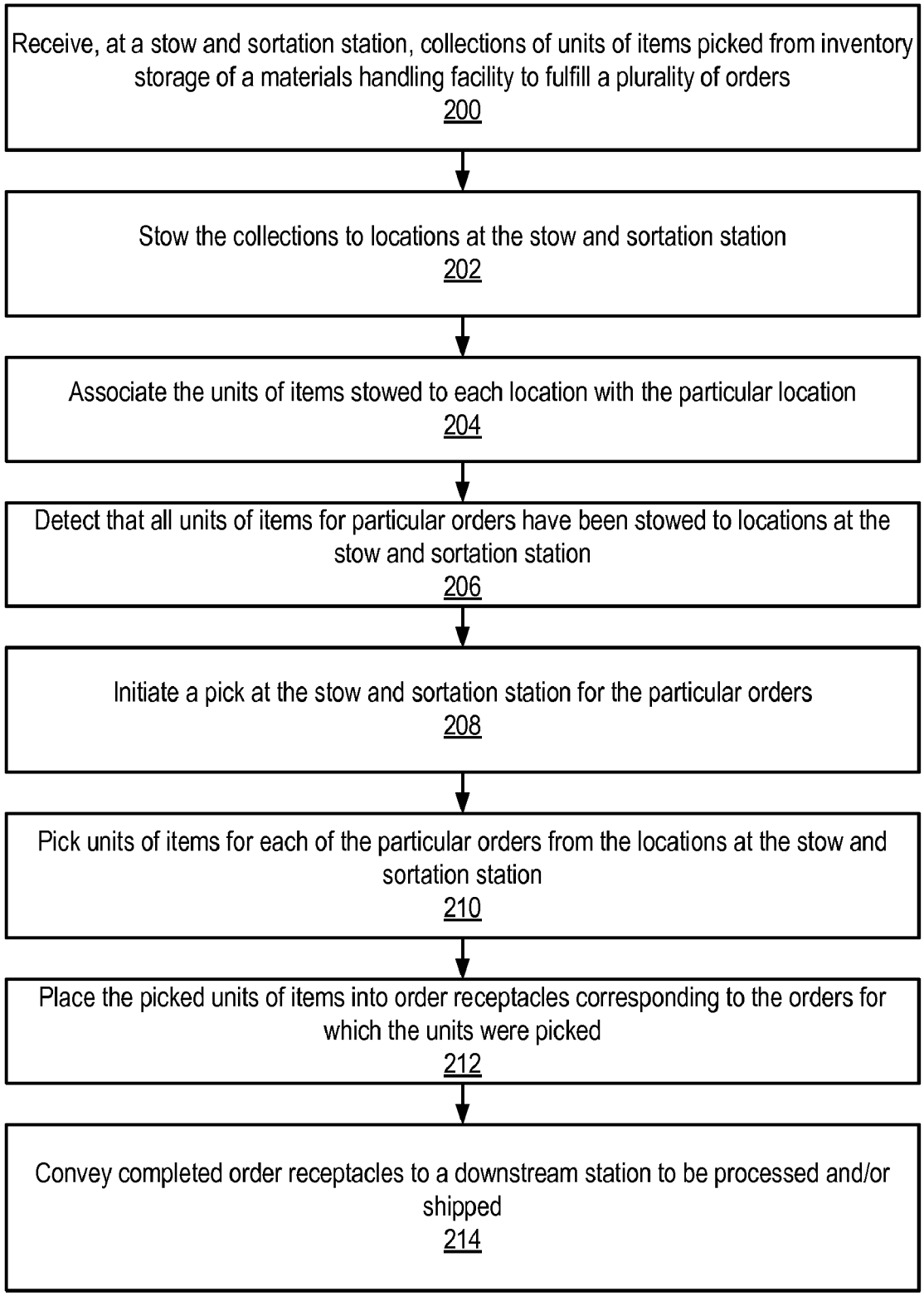
FIG. 5 is a flowchart illustrating a method of operation for a stow and sortation system according to one embodiment.

FIG. 5 is a flowchart illustrating a method of operation for a stow and sortation system according to one embodiment. The method as illustrated in FIG. 5 may be performed as a continuous or near-continuous process in the materials handling facility to sort a continuous or near-continuous incoming stream of collections of mixed items picked to fulfill orders into their respective orders.

As indicated at 200, collections of units of items picked from inventory storage of a materials handling facility to fulfill a plurality of orders may be received at a stow and sortation station. In one embodiment, each collection may be contained in a pick receptacle. As indicated at 202, the received collections may be stowed to locations at the stow and sortation station. In one embodiment, each received collection of items is stowed to a randomly selected location. In one embodiment, each received collection of items is stowed to an empty location.

In one embodiment, the stow and sortation station may include one or more bins, with each bin including two or more slots, and each location may be a slot in a bin. In one embodiment, the stow and sortation station may be subdivided into two or more substation, with each substation including a subset of the locations, for example one or more bins each including two or more slots (locations). said stowing received collections of items comprises stowing the pick receptacles containing the collections of items to the locations. In one embodiment, to stow a received collection of items to a location, the collection of items in a pick receptacle may be conveyed from the pick receptacle to the location. In one embodiment, to stow a received collection of items to a location, the pick receptacle containing the collection of items may be stowed to the location.

As indicated at 204, the units of items stowed to each location may be associated with the particular location. In one embodiment, to associate a received collection with the location to which the collection is stowed, information identifying the collection and the location may be communicated to a control system. In one embodiment, each collection may be contained in a pick receptacle, and the information identifying the collection may be a receptacle identifier scanned or otherwise read from the pick receptacle. Alternatively, identifiers from individual units of items in the collection may be scanned or otherwise read to identify the items in the collection. In one embodiment, a location identifier associated with the location to which the collection is stowed may be scanned or otherwise read to identify the location.

As indicated at 206, a control system may detect that all units of items for particular orders have been stowed to locations at the stow and sortation station. In response to detecting that all items for the particular orders are stowed, the control system may initiate a pick at the stow and sortation station for the particular orders, as indicated at 208.

At the stow and sortation station, units of items for each of the particular orders may then be picked from the locations at the stow and sortation station at which the units are stowed, as indicated at 210. The picked units of items may be placed into order receptacles corresponding to the orders for which the units were picked, as indicated at 212. In one embodiment, the order receptacles may be shipping containers.

Illustrative System

In one embodiment, a system that implements one or more components of a stow and sortation system as described herein may include a general-purpose computer system that includes or is configured to access one or more computer-accessible media, such as computer system 900 illustrated in FIG. 6. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190 in a stow and sortation system, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the stow and sortation system described above. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 5 for implementing a control system for, or possibly other components of, a stow and sortation system. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A sortation system, comprising:
   a control system; and
   a stow and sortation station, wherein the stow and sortation station comprises a plurality of locations for stowing collections of items picked from inventory storage of a materials handling facility to fulfill a plurality of orders, wherein each collection is separately picked from the inventory storage and includes one or more units of items picked from the inventory storage to fulfill one or more of the plurality of orders, wherein at least one of the collections includes items picked for two or more different orders and at least one of the collections includes two or more heterogeneous items;
   wherein the control system is configured to:
      determine stowing of each of the collections of items to a respective location at the stow and sortation station;
      associate the units of items in the collections with the locations to which the collections are stowed;
      detect that all units of items for particular orders are stowed at the locations of the stow and sortation station; and
      direct picks for the particular orders at the stow and sortation station from the locations into order receptacles corresponding to the particular orders in response to said detection that all units of items for particular orders are stowed at the locations of the stow and sortation station.

2. The sortation system as recited in claim 1, wherein, to associate the units of items in the collections with the locations to which the collections are stowed, the control system is configured to receive information from the stow and sortation station associating each stowed collection of items with the particular location of the stow and sortation station to which the collection of items is stowed.

3. The sortation system as recited in claim 1, wherein each collection of items is picked from the inventory storage into a pick receptacle, and wherein, to associate the units of items in the collections with the locations to which the collections are stowed, the control system is configured to:
   receive a receptacle identifier associated with a pick receptacle from the stow and sortation station;
   receive a location identifier associated with the particular location of the stow and sortation station to which the collection of items in the pick receptacle is stowed from the stow and sortation station; and
   associate the stowed collection of items with the particular location of the stow and sortation station to which the collection of items is stowed in accordance with the receptacle identifier and the location identifier.

4. The sortation system as recited in claim 1, wherein each collection of items is picked from the inventory storage into a pick receptacle, and wherein the collections of items are stowed to the locations by inducting the pick receptacles containing the collections of items into the locations.

5. The sortation system as recited in claim 1, wherein each collection of items is picked from the inventory storage into a pick receptacle, and wherein the collections of items are stowed to the locations by conveying the collections of items from the pick receptacles containing the collections of items to the locations.

6. The sortation system as recited in claim 1, wherein the stow and sortation system comprises two or more substations, wherein each substation comprises one or more bins, wherein each bin comprises two or more slots, wherein each slot is one of the plurality of locations, and wherein one or more agents of the materials handling facility are assigned to each substation.

7. The sortation system as recited in claim 1, wherein the order receptacles are shipping containers.

8. The sortation system as recited in claim 7, wherein at least a portion of the shipping containers are branded shipping containers.

9. The sortation system as recited in claim 1, wherein each collection of items is stowed to a randomly selected location at the stow and sortation station.

10. The sortation system as recited in claim 1, wherein the stow and sortation station comprises a bulk stowage area for stowing bulk quantities of one or more items, and wherein the control system is configured to direct picking of one or more units of items for one or more of the particular orders from the bulk stowage area into order receptacles corresponding to the one or more orders.

11. The sortation system as recited in claim 1, wherein the control system is configured to:
   determine that a unit of an item needed to fulfill a first order has been picked from inventory storage and stowed to a location of the stow and sortation station for a second order; and
   direct picking of the unit of the item from the location to fulfill the first order.

12. A method, comprising:
   picking collections of items from inventory storage of a materials handling facility to fulfill a plurality of orders, wherein each collection is separately picked from the inventory storage and includes one or more units of items picked from the inventory storage to fulfill one or more of the plurality of orders, wherein at least one of the collections includes items picked for two or more different orders and at least one of the collections includes two or more heterogeneous items;
   conveying the collections of items to a stow and sortation station;
   determining stowing of each of the collections of items to a respective location at the stow and sortation station;
   associating the units of items in the collections with the locations to which the collections are stowed;
   detecting that all units of items for particular orders are stowed at the locations of the stow and sortation station; and
   in response to said detecting that all units of items for particular orders are stowed at the locations of the stow and sortation station, picking units of items for the particular orders from two or more of the plurality of locations and placing the units of items picked for the particular orders from the two or more locations into order receptacles corresponding to the particular orders.

13. The method as recited in claim 12, wherein said associating the units of items in the collections with the locations to which the collections are stowed comprises communicating information from the stow and sortation station to a control system, wherein the information associates each stowed collection of items with the particular location of the stow and sortation station to which the collection of items is stowed.

14. The method as recited in claim 12, wherein each received collection of items is contained in a pick receptacle, and wherein said stowing the collections of items to a plurality of locations of the stow and sortation station comprises stowing the pick receptacles containing the collections of items to the locations.

15. The method as recited in claim 12, wherein each received collection of items is contained in a pick receptacle, and wherein said stowing the collections of items to a plurality of locations of the stow and sortation station comprises conveying the collections of items from the pick receptacles containing the collections of items to the locations.

16. The method as recited in claim 12, wherein the stow and sortation system comprises two or more substations, wherein each substation comprises one or more bins, wherein each bin comprises two or more slots, wherein each slot is one of the plurality of locations, and wherein one or more agents of the materials handling facility are assigned to each substation.

17. The method as recited in claim 12, wherein the order receptacles are shipping containers.

18. The method as recited in claim 12, wherein said stowing the collections of items to a plurality of locations of the stow and sortation station comprises stowing each received collection of items to a randomly selected location at the stow and sortation station.

19. A materials handling facility, comprising:
a control system;
an inventory storage; and
one or more stow and sortation stations, wherein each stow and sortation station comprises a plurality of locations for stowing collections of items picked from the inventory storage to fulfill a plurality of orders, wherein each collection is separately picked from the inventory storage and includes one or more units of items picked from the inventory storage to fulfill one or more of the plurality of orders, wherein at least one of the collections includes items picked for two or more different orders and at least one of the collections includes two or more heterogeneous items;
wherein the control system is configured to:
direct picking of the collections of items from the inventory storage to fulfill the plurality of orders;
receive information from each stow and sortation station for each stowed collection indicating a particular location to which the collection is stowed;
associate the one or more units of items in each stowed collection with the particular location to which the respective collection is stowed;
detect that all units of items for a particular order are stowed at one or more locations of one of the stow and sortation stations; and
direct a pick for the particular order from the one or more locations at the respective stow and sortation station into one or more order receptacles corresponding to the particular order in response to said detection.

* * * * *